United States Patent
Todokoro et al.

[19]

[11] Patent Number: 6,033,636
[45] Date of Patent: Mar. 7, 2000

[54] METHOD OF RECOVERING URANIUM AND TRANSURANIC ELEMENTS FROM SPENT NUCLEAR FUEL

[75] Inventors: Akio Todokoro; Yoshiyuki Kihara, both of Ibarami-ken; Takashi Okada, Hitachinaka, all of Japan

[73] Assignee: Japan Nuclear Development Institute, Tokyo, Japan

[21] Appl. No.: 09/048,342

[22] Filed: Mar. 26, 1998

[30] Foreign Application Priority Data

Apr. 4, 1997 [JP] Japan .................................. 9-086463

[51] Int. Cl.⁷ .......................... C01G 43/00; C01G 56/00; C22B 60/00
[52] U.S. Cl. .............................. 423/18; 423/11; 423/250; 423/251; 423/253
[58] Field of Search .................................. 423/11, 12, 18, 423/250, 251, 253; 976/DIG. 279; 205/44, 46; 23/296, 297

[56] References Cited

U.S. PATENT DOCUMENTS

| | | | |
|---|---|---|---|
| 3,243,256 | 3/1966 | Rateau | 423/253 |
| 3,672,848 | 6/1972 | Mills et al. . | |
| 3,932,225 | 1/1976 | Bilal et al. | 423/3 |
| 4,333,912 | 6/1982 | Mills et al. . | |
| 4,358,426 | 11/1982 | Tallent et al. . | |
| 4,439,279 | 3/1984 | Herrmann et al. . | |
| 4,609,533 | 9/1986 | Heckmann et al. | 423/11 |
| 4,686,019 | 8/1987 | Ryan et al. . | |
| 4,839,149 | 6/1989 | Madiac et al. | 423/251 |

FOREIGN PATENT DOCUMENTS

| | | |
|---|---|---|
| 0 599 509 A1 | 6/1994 | European Pat. Off. . |
| 60-205398 | 10/1985 | Japan . |
| 4-140698 | 5/1992 | Japan . |
| 1368526 | 9/1974 | United Kingdom . |
| 1378409 | 12/1974 | United Kingdom . |
| 2000189 | 1/1979 | United Kingdom . |
| 2029451 | 3/1980 | United Kingdom . |
| 2217732 | 11/1989 | United Kingdom . |
| 2298952 | 9/1996 | United Kingdom . |

*Primary Examiner*—Steven Bos
*Attorney, Agent, or Firm*—Oliff & Berridge, PLC

[57] ABSTRACT

The steps for recovering uranium and transuranic elements are simplified, and the generation of waste solvent and waste materials is suppressed. Spent nuclear fuel is dissolved in nitric acid (S100) and the resulting solution is subjected to electrolytic oxidation so that U, Np, Pu, Am is oxidized to VI using Ce as oxidation catalyst. The solution is cooled, and nitrates of valence VI thereby deposit as crystals and are separated from the mother liquor (S104). The mother liquor is heated and concentrated (S114). The mixed crystalline deposit is dissolved in nitric acid (S106), uranyl nitrate is deposited alone by cooling (S108), and the crystals are separated from the U, Np, Pu, Am mixed solution (S110). The uranyl nitrate is dissolved in nitric acid (S112), and the heated and concentrated mother liquor is added to it to prepare another mixed solution. This mixed solution is then subjected to electrolytic oxidation to oxidize the remaining U, Np, Pu, Am to valence VI, and the solution is cooled so that U, Np, Pu, Am are coprecipitated with uranyl nitrate as crystals, and can be separated from high level radioactive effluent (S118).

19 Claims, 3 Drawing Sheets

SOLUBILITY OF URANYL NITRATE

METHOD OF RECOVERING URANIUM AND TRANSURANIC ELEMENTS FROM SPENT NUCLEAR FUEL

BACKGROUND OF THE INVENTION

This invention relates to a method of recovering uranium and transuranic elements from spent nuclear fuel, and in particular to a method for recovering uranium and transuranic elements wherein the uranium and transuranic elements are oxidized to a valency at which they can be deposited, and a solid/liquid separation from other elements performed so that the uranium and transuranic elements are recovered.

DESCRIPTION OF THE RELATED ART

In nuclear fuel reprocessing, one method considered for disposing of high level radioactive waste is that of stratum disposal wherein uranium and transuranic elements such as neptunium (Np) or americium (Am) in spent nuclear fuel are subjected to glass caking so as to contain the radioactivity (radioactive substances). However in stratum disposal, millions of years are needed to reduce the hazard posed by uranium and transuranic elements to that of natural uranium. On this account, a strong desire has recently emerged to recover and re-use these uranium and transuranic elements without discharging them as nuclear waste.

Moreover the uranium and transuranic element Np for example changes its valence to IV, V and VI in a complex way, so a variety of valence adjusting chemical reagents had to be used to separate Np by the solvent extraction method, and recover it. In this solvent extraction method, there were a large number of separation and recovery steps and the process was complicated. For example, tributyl phosphoric acid (TBP) which is used in the aforesaid solvent extraction method to dissolve spent nuclear fuel, is decomposed by nitric acid and radioactive rays or heat of radioactive decay. This led to a risk of decreased extraction efficiency or to generating of materials that could start a fire. There was also a problem in that waste was generated in each separation and recovery step, so the amount of waste generated increased.

Am is stable in nitric acid solution at a valency of III, and cannot therefore be extracted with TBP. There is another method where Am is extracted from the mother liquor of spent nuclear fuel by a phosphoric acid double ligand extractant (such as CMPO) after having recovered uranium (U) and plutonium (Pu) using TBP, but the recovery of Am was complex, and as in the case of Np, there was also a problem in that waste fluid, waste solvent and waste materials increased.

SUMMARY OF THE INVENTION

It is therefore an object of this invention, which was conceived in view of the above problems, to simplify the recovery of uranium and transuranic elements and provide a method of recovering uranium and transuranic elements from spent nuclear fuel that suppresses generation of waste fluid, waste solvent and waste materials.

In order to solve these problems, the method of recovering uranium and transuranic elements from spent nuclear fuel according to this invention has the following characteristics.

(1) In a method to recover uranium and transuranic elements which can be used as nuclear fuel from spent nuclear fuel, spent nuclear fuel is dissolved in nitric acid and the solution obtained is subjected to electrolytic oxidation. After electrolytic oxidation, the solution is cooled and nitrates of uranium and transuranic elements are coprecipitated and recovered together with uranyl nitrate from the solution. Since the uranium and transuranic elements are oxidized by an oxidation catalyst to a valency at which their nitrates deposit, and after cooling are coprecipitated with uranyl nitrate, a solvent for recovering the uranium and transuranic elements such as was used in the prior art is no longer needed. Moreover as waste solvent is not generated, this method of recovery can be considered environment-friendly. Further, there is no need to perform plural solvent extractions as in the prior art, so the recovery of uranium and transuranic elements is simplified.

(2) In the above method (1) for recovering uranium and transuranic elements from spent nuclear fuel, the uranyl nitrate and nitrates of uranium and transuranic elements recovered by coprecipitation are redissolved in nitric acid and the mixed solution obtained is cooled, whereupon only uranyl nitrate is deposited. The uranyl nitrate is filtered off and redissolved in nitric acid, the uranyl nitrate solution thus obtained is adjusted, the mother liquor resulting from the coprecipitation step of (1) is combined with this uranyl nitrate solution and the mixed solution thus obtained is electrolytically oxidized.

After electrolytic oxidation the mixed solution is cooled, and residual nitrates of uranium and transuranic elements are coprecipitated with uranyl nitrate from the mixed solution.

By combining the mother liquor after coprecipitation of the aforesaid step (1) with the solution of uranyl nitrate which was deposited and filtered off, nitrates of uranium and transuranic elements remaining in the mother liquor can be precipitated and recovered together with the uranyl nitrate. As no uranium and transuranic elements are discharged in high level radioactive waste, the risk associated with processing and disposal of uranium and transuranic elements (including that of stratum disposal) is reduced to acceptable levels.

In the aforesaid recovery method (2), the solution obtained by mixing uranyl nitrate solution with the mother liquor was electrolytically oxidized, but the invention is not limited to this arrangement. Instead, uranium and transuranic elements in the mother liquor may first be oxidized by electrolytic oxidation, the aforesaid uranyl nitrate solution then dripped in, and the mixed solution cooled to precipitate the nitrates of uranium and transuranic elements together with uranyl nitrate.

(3) In the method of recovering uranium and transuranic elements described in (1) or (2), when spent nuclear fuel is dissolved in nitric acid, or when the mother liquor resulting from the coprecipitation of step (1) is mixed with the aforesaid uranyl nitrate solution, an oxidation catalyst is added, electrolytic oxidation is performed and the nitrates of uranium and transuranic elements are coprecipitated and recovered together with uranyl nitrate.

When the spent nuclear fuel and oxidation catalyst are added to nitric acid and electrolytic oxidation is performed, the uranium and transuranic elements are oxidized to an atomic valence at which their nitrates can be precipitated while the spent nuclear fuel is dissolving in the nitric acid. Due to this, the process of recovering the uranium and transuranic elements can be further shortened.

(4) The oxidation catalyst in the method of recovering uranium and transuranic elements described in the aforesaid (3) is at least one element chosen from among cerium (Ce), silver (Ag) and cobalt (Co).

For example, Ce(III) is oxidized to Ce(IV) by electrolytic oxidation. This oxidized Ce (IV) oxidizes Np, Pu and Am in the solution to valence VI while itself being reduced to Ce(III). Similarly, Ag(I), Co(II) are themselves oxidized by electrolytic oxidation and the oxidized Ag, Co oxidize almost all of the Np. Pu and Am in the solution to valence VI. In particular Ce and Ag are contained in nuclear fission products (FP) in the spent nuclear fuel, and they function as oxidation catalysts causing uranium and transuranic elements to crystallize even if they are not added to the solution from an external source.

(5) In the method of recovering uranium and transuranic elements of (1) to (3) hereabove, the uranium and transuranic elements are uranium (U), neptunium (Np), plutonium (Pu) and americium (Am).

According to prior art techniques, it was very difficult to process and dispose of Np and Am as high level radioactive waste. Using this invention, Np, Pu and Am can now be used as nuclear fuel, e.g. for fast breeder reactors such as "Monju", and generation of high-level radioactive waste can be reduced as a result.

DESCRIPTION OF THE PRESENT INVENTION

A preferred embodiment of this invention will now be described.

Figure 1:
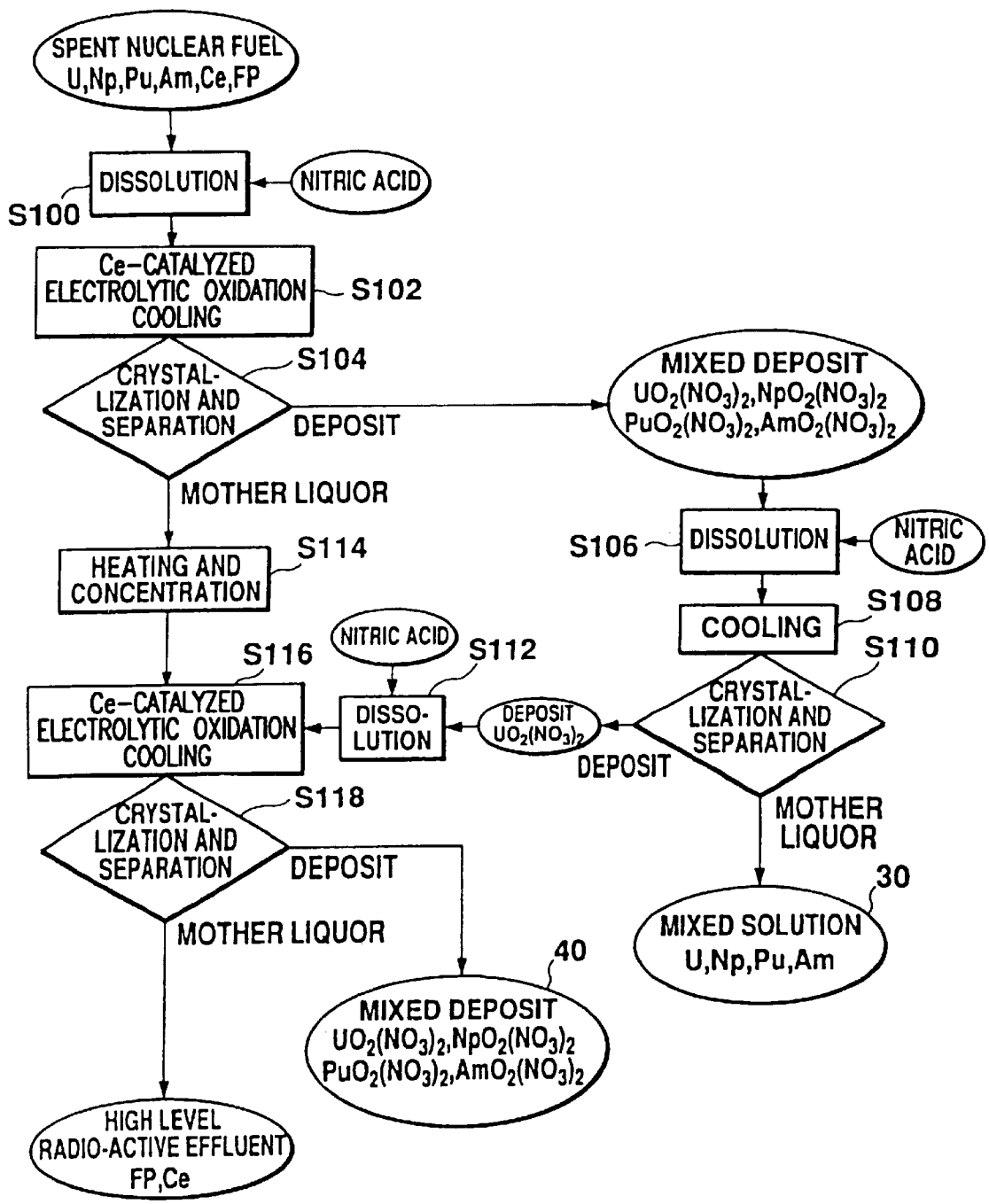
FIG. 1 is a flowchart showing a method for recovering uranium and transuranic elements from spent nuclear fuel according to this invention.

The method of recovering uranium and transuranic elements from spent nuclear fuel according to this embodiment will be explained referring to FIG. 1.

Spent nuclear fuel contains uranium (U), neptunium (Np), plutonium (Pu), americium (Am), cerium (Ce), and other nuclear fission products (referred to hereafter as "FP"). Nearly all of this spent nuclear fuel is U.

The aforesaid spent nuclear fuel is dissolved in nitric acid (2–4 N) at room temperature in an electrolytic oxidation container described hereafter (step 100, hereafter steps will be referred to by "S") so as to give a solution. This solution contains uranium (U) which has a valency of VI; neptunium (Np) which is transuranic element having a valency of IV, V, or VI; plutonium (Pu) which is a transuranic element having a valency of IV; americium (Am) having an atomic valence of III; and FP such as cerium (Ce).

The Ce(III) in this solution is oxidized to Ce(IV) by electrolytic oxidation (S102). This oxidized Ce (IV) oxidizes Np, Pu, and Am in the solution to valency VI, and is itself reduced to Ce(III). Ce functions as an oxidation catalyst due to continuous electrolytic oxidation (S102).

As a result, Np, Pu, Am are converted to Np, Pu, Am nitrates wherein the metal has a valence of VI, which have a low solubility as in the case of U nitrate and are coprecipitated and recovered together with U nitrate.

In this embodiment, Ce in spent nuclear fuel was used as the oxidation catalyst, but additional Ce may be added during electrolytic oxidation. As the oxidation catalyst, silver (Ag) and cobalt (Co) may be used as a substitute for Ce. Ag, Co are themselves oxidized due to electrolytic oxidation as in the case of Ce, and the oxidized Ag(II), Co(III) oxidize almost all the Np, Pu, Am in the solution to valency VI. Ag is also contained in FP as in the case of Ce.

The electrolytic oxidation container is then cooled so as to cool the solution, nitrates comprising uranyl nitrate, neptunyl nitrate, plutonyl nitrate and americyl nitrate are deposited, and this mixed deposit ($UO_2(NO_3)_2$, $NpO_2(NO_3)_2$, $PuO_2(NO_3)_2$, $AmO_2(NO_3)_2$) is separated (S104). In this way, U, Np, Pu, Am are coprecipitated and recovered together. The cooling temperature preferably lies within a range of $-20°$ C. to $-40°$ C.

According to this embodiment, electrolytic oxidation was performed after dissolving the spent nuclear fuel in nitric acid and subsequently cooling, but the invention is not limited to this arrangement. Alternatively, for example, the spent nuclear fuel may be dissolved in nitric acid while performing electrolytic oxidation and simultaneously cooling the solution. In such a case, the procedure up to the crystallization and separation step (coprecipitation and recovery step) may be performed continuously while the oxides are converted to nitrates, and the whole process of recovering uranium and transuranic elements can be shortened. Also, at the aforesaid cooling temperature, the nitrate of Ce does not separate.

The mother liquor from crystallization (S104) comprises FP containing Ce, and small residual amounts of U, Np, Pu and Am. To further separate and recover this U, Np, Pu, Am which remains behind in the mother liquor, the mother liquor is first heated and concentrated (S114).

The mixed deposit which was crystallized and separated in S104 is then dissolved in dilute nitric acid (e.g. 1–2 N)(S106). In dilute nitric acid, Np is reduced to valency IV, V, Pu is reduced to valency IV, and Am is reduced to valency III. When the dilute nitric acid solution (S108) is cooled, only a part of the U is deposited as uranyl nitrate, and crystallizes and separates from a mixed solution containing U, Np, Pu, and Am (S110).

The uranyl nitrate which separated is dissolved in nitric acid (e.g. 1–2N) (S112), giving a nitric acid solution. This nitric acid solution is added to the heated and concentrated mother liquor so as to prepare a mixed solution. In addition to residual U, Np, Pu, and Am, Ce exists in the mother liquor, so Ce also exists in the mixed solution. This Ce acts as an oxidation catalyst in the aforementioned electrolytic oxidation of the mixed solution. oxidizing the remaining U, Np, Pu, and Am to an atomic valency of VI. Deposition of the residual uranyl nitrate, neptunyl nitrate, plutonyl nitrate and americyl nitrate is then promoted by cooling with uranyl nitrate as a scavenger (coprecipitation) (S116).

In the aforesaid S116, amixed solution was prepared by adding the nitrate solution prepared in S112 to the mother liquor and subjecting this mixed solution to electrolytic oxidation, however the invention is not limited to this arrangement. Instead, the mother liquor may be subjected to electrolytic oxidation using the oxidation catalysts in the mother liquor so as to oxidize residual U, Np, Pu, Am in the mother liquor to an atomic valence of VI, the aforesaid nitrate solution containing uranyl nitrate dripped in, and the solution then cooled to promote deposition of residual uranyl nitrate, neptunyl nitrate, plutonyl nitrate, and americyl nitrate using the uranyl nitrate added later as a scavenger.

The mixed deposit $[UO_2(NO_3)_2$, $NpO_2(NO_3)_2$, $PuO_2(NO_3)_2$, $AmO_2(NO_3)_2]$ is thereby crystallized and separated from high level radioactive effluent containing FP such as Ce (S118).

A mixed solution 30 and mixed deposit 40 are denitrated and oxidized in the next process so as to produce nuclear fuel which is recycled.

Next, the electrolytic oxidation container used in the method of recovering uranium and transuranic elements from spent nuclear fuel according to this embodiment will be described using FIG. 2.

Figure 2:
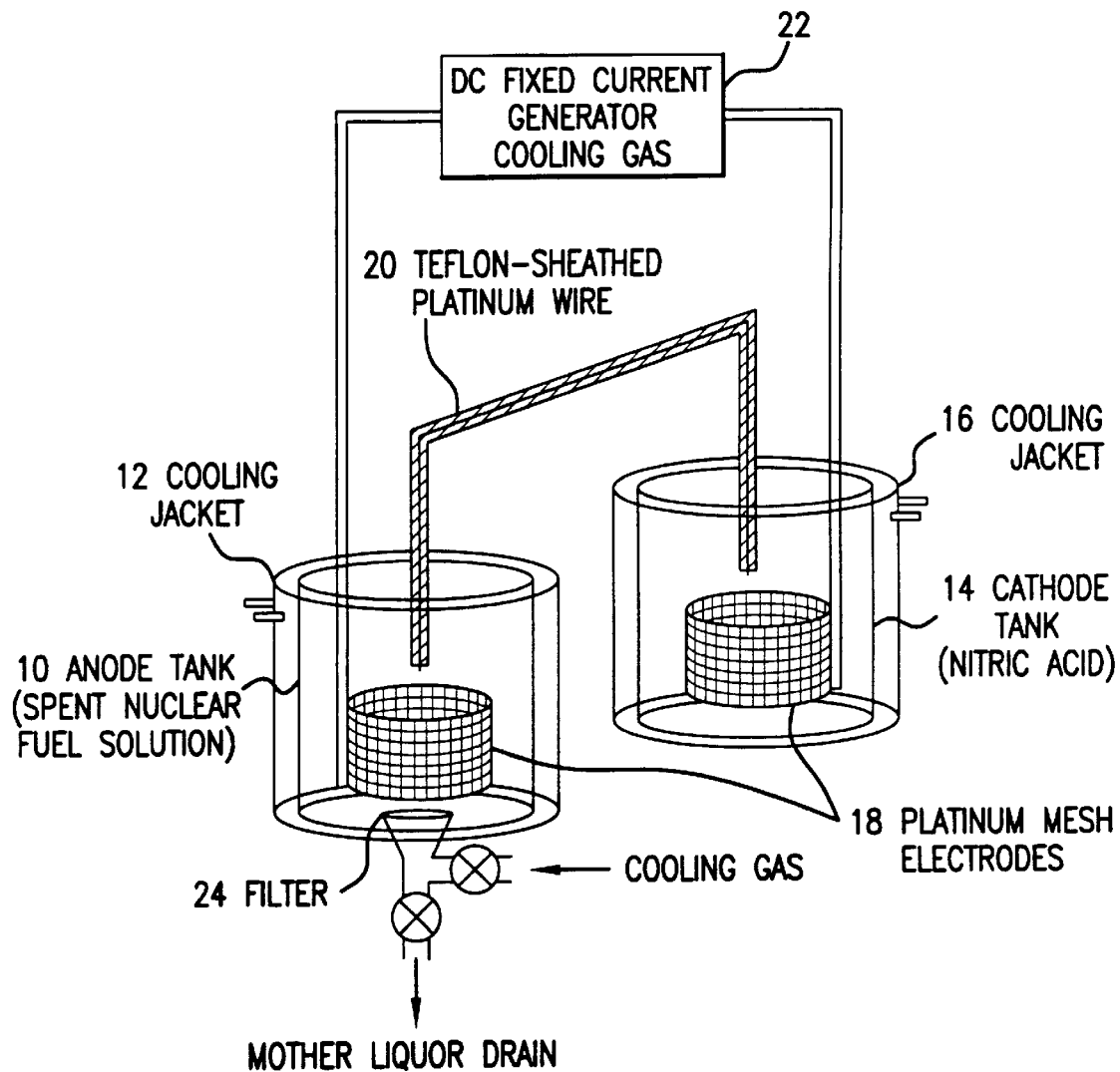
FIG. 2 shows, in schematic form, a typical electrolytic oxidation test container used for recovery of uranium and transuranic elements from spent nuclear fuel according to this invention.

As shown in FIG. 2, an anode tank 10 is filled with a spent nuclear fuel solution made up by dissolving nuclear fuel in nitric acid (2–4 N). A cooling jacket 12 is fixed on the outer wall of the anode tank 10, and a cooling gas is blown into the jacket 12 so that the temperature of the anode tank 10 is maintained at −20° C. to −40° C. A cathode tank 14 on the other hand contains nitric acid of sufficient concentration to pass an electric current.

Platinum mesh electrodes 18 are arranged respectively in the anode tank 10 and cathode tank 14, the two platinum mesh electrodes 18 being electrically connected to a DC fixed current generator 22. Teflon-sheathed platinum wires 20 capable of carrying an electric current are also immersed in the solutions in the anode tank 10 and cathode tank 14.

A filter 24 is installed on the base of the anode tank 10. Using the electrolytic oxidation test container shown in FIG. 2, uranium and uranium and transuranic elements are oxidized to an atomic valence of VI, and the uranyl nitrate, neptunyl nitrate, plutonyl nitrate and americyl nitrate which deposit on cooling are separated by crystallization on the filter 24. The mother liquor is transferred to a subsequent heating/concentration step via a mother liquor drain.

According to the method of recovering uranium and transuranic elements from spent fuel according to this embodiment therefore, nitrates of these elements are oxidized by electrolytic oxidation to an atomic valence (i.e. VI) at which they have low solubility in the nitrate solution, using, for example, Ce in FP as an oxidation catalyst. After, or at the same time as, electrolytic oxidation, the solution is cooled so that the nitrates of uranium and transuranic elements selectively crystallize. Use of a solvent to recover the transuranic element is therefore not required as it was in the prior art. This does not generate any waste solvent so the method is environment-friendly. Moreover, it is unnecessary to perform solvent extractions using plural solvents as in the conventional method, so the recovery of uranium and transuranic elements is simplified.

DESCRIPTION OF THE ACTUAL EXAMPLES

This invention will now be described in detail with reference to specific embodiments.

Spent nuclear fuel having the composition [U:96%, Np:0.075%, Pu:0.91%, Am:0.014%, Ce:02.5%, Ag:0.004% and other FP (wt%), PWR fuel, average output 30MW/Mg, cooling 150 days] and 3N nitric acid were introduced in an anode tank 10 of an electrolytic oxidation tank shown in FIG. 2, a current of 0.5A (anode current density 82.4mA/cm$^2$) was passed, and the spent nuclear fuel dissolved in the nitric acid at room temperature.

A Ce catalyst and Ag catalyst were added, and after adjusting the nitric acid concentration of the solution to effectively 2N, electrolytic oxidation was performed for 1 hour at room temperature by passing a DC current of 0.5A at 7V between platinum electrodes. A cooling gas was introduced into a cooling jacket 12 during electrolysis, and the anode tank 10 was cooled to −20° C. The Ce(III) and Ag(I) in the nitric acid solution were then oxidized respectively to Ce(IV) and Ag(II), and the Ce(IV) and Ag(II) oxidized U, Np, Pu, and Am to valence VI causing U, Np, Pu, and Am (all valence VI) nitrates to crystallize out in the anode tank 10.

Next, the current between the platinum electrodes was stopped, a mother liquor drain was opened, and the crystals of U, Np, Pu, Am (all valence VI) nitrates were filtered off from the mother liquor on a filter. The crystals were then rinsed with nitric acid which had been cooled to −20° C.

The crystal yields were uranyl nitrate 70–80%, neptunyl nitrate 70–80%, plutonyl nitrate 40–50% and americyl nitrate 40–50%.

Next, the crystals were dissolved in 2N nitric acid, and the solution was again cooled to −40° C. This caused uranyl nitrate to crystallize, and it was separated from the mixed solution of Np, Pu, Am nitrates.

Next, the aforesaid mother liquor was heated and concentrated, the uranyl nitrate obtained hereabove was added, and the strength of the nitrate solution was adjusted to 2N. Electrolytic oxidation was performed under the same conditions as those described hereabove, whereupon Np, Pu, Am ions (all valence VI) crystallized as nitrates together with the uranyl nitrate which had been added as a scavenger. This recrystallized mixture was then filtered off from the remaining high level radioactive effluent.

According to this embodiment, electrolytic oxidation was performed after adding uranyl nitrate to the mother liquor. Alternatively however, the concentrated mother liquor can first be subjected to electrolytic oxidation using the Ce and Ag already present in the mother liquor as oxidation catalysts. After the residual U, Np, Pu, and Am in the mother liquor are oxidized to valence VI, the aforesaid nitrate solution containing uranyl nitrate is dripped in, and the solution cooled. The residual uranyl nitrate, neptunyl nitrate, plutonyl nitrate, and americyl nitrate then crystallize out due to the scavenger action of the added uranyl nitrate.

The crystal yields when the crystals were filtered off from high level radioactive effluent were uranyl nitrate 91–96%, neptunyl nitrate 91–96%, plutonyl nitrate 64–75%, and americyl nitrate 64–75%.

The high level radioactive effluent was concentrated and adjusted to a nitric acid concentration of 6N. Ce or a similar electrolysis catalyst was added to the concentrated effluent, and the effluent subjected to electrolytic oxidation whereupon the residual uranyl nitrate in the effluent crystallized and was recovered.

Finally therefore, effectively no U, Np, Pu, or Am ions remained in the effluent, and almost all the uranium and transuranic elements were recovered by the aforesaid procedure.

Figure 3:
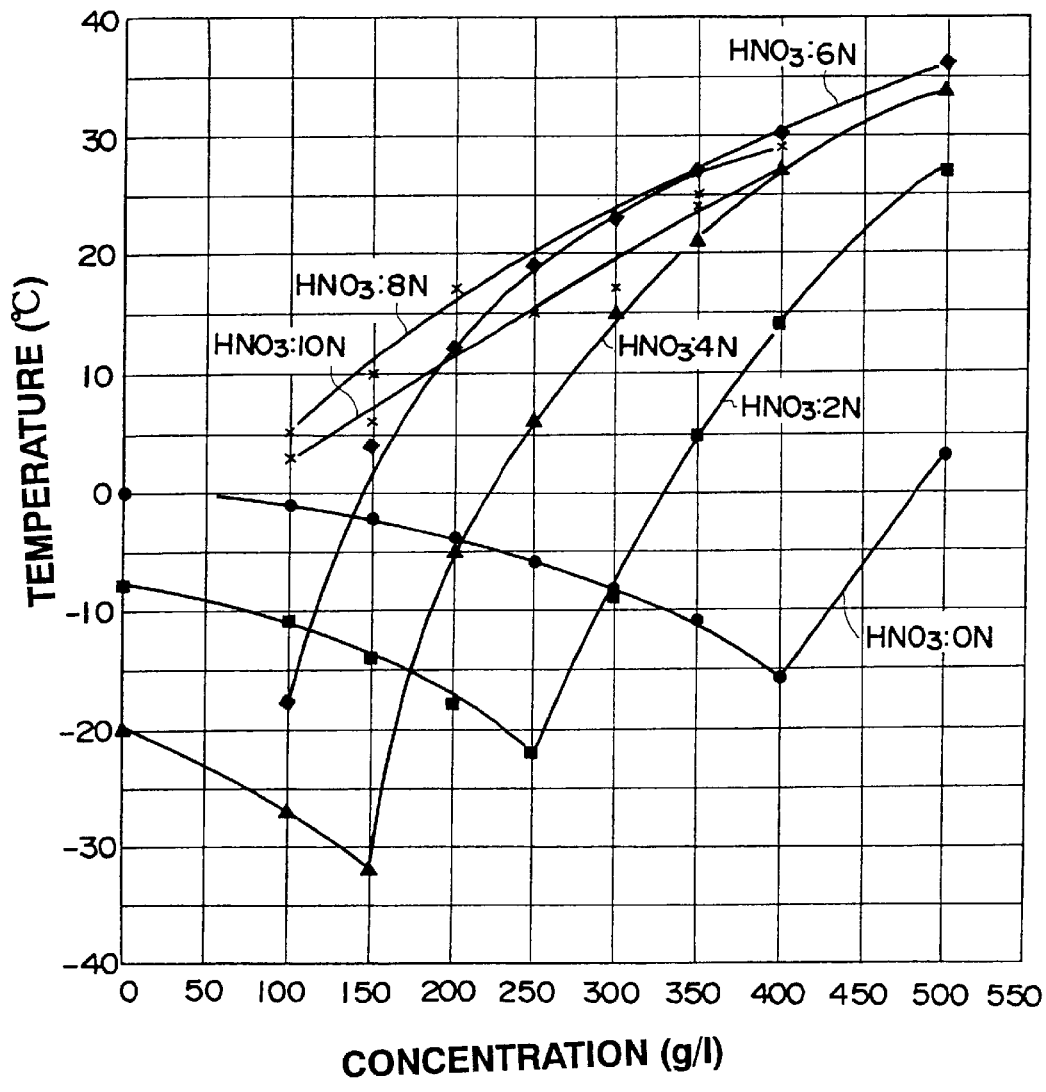
FIG. 3 shows the solubility of uranyl nitrate (literature value).

According to FIG. 3, it is seen that the solubility of uranyl nitrate in the nitrate solution is lower and the crystal yield is higher for a higher concentration of nitric acid. However when Am(III) is oxidized to Am(VI) during electrolytic oxidation, the amount of oxidation is 65% for an acid concentration of 1N, 50% for an acid concentration of 2N, and oxidation does not occur at all at an acid concentration of 3N. In this embodiment, therefore, the nitric acid concentration during electrolysis was set at 2N.

Hence in the method of separating uranium and transuranic elements from spent nuclear fuel according to this invention, since a solvent is not used unlike the case of the prior art, the number of steps involved is reduced, and the generation of effluent and waste solvent are suppressed. The amount of Pu, Np, and Am present in high level radioactive effluent becomes almost zero, the amount of waste products is reduced, and disposal management is made easier. Also, although it is already possible to recycle U, Pu as nuclear fuel for conventional light water reactors, this invention permits recycling of also Np, Am as nuclear fuel for fast breeder reactors (e.g. "Monju").

What is claimed:

1. A method for recovering, from spent nuclear fuel, uranium and transuranic elements which can be used as nuclear fuel, comprising the steps of:
   dissolving said spent nuclear fuel in nitric acid to form a solution;
   subjecting the solution to electrolytic oxidation;
   cooling said solution after subjecting said solution to electrolytic oxidation; and
   coprecipitating nitrates of uranium and transuranic elements and uranyl nitrate from the cooled solution.

2. A method for recovering, from spent nuclear fuel, uranium and transuranic elements which can be used as nuclear fuel as defined in claim 1, further comprising the steps of:
   redissolving said coprecipitated uranyl nitrate and nitrates of uranium and transuranic elements in nitric acid;
   cooling a first mixed solution obtained by the step of redissolving, selectively precipitating said uranyl nitrate, and filtering said uranyl nitrate;
   redissolving the filtered uranyl nitrate in nitric acid so as to prepare a uranyl nitrate solution;
   mixing a mother liquor resulting from the step of coprecipitating with said uranyl nitrate solution so as to form a second mixed solution;
   subjecting the second mixed solution to electrolytic oxidation; and
   cooling said second mixed solution after electrolytic oxidation, and coprecipitating said nitrates of uranium and transuranic elements and said uranyl nitrate from said second mixed solution.

3. A method for recovering uranium and transuranic elements as defined in claim 1, wherein when dissolving said spent nuclear fuel in nitric acid,
   an oxidation catalyst is added;
   electrolytic oxidation is performed; and
   said nitrates of uranium and transuranic elements and said uranyl nitrate are coprecipitated.

4. A method for recovering uranium and transuranic elements as defined in claim 2, wherein when dissolving said spent nuclear fuel in nitric acid and mixing the mother liquor resulting from the step of coprecipitating with said uranyl nitrate solution,
   an oxidation catalyst is added, electrolytic oxidation is performed; and
   said nitrates of uranium and transuranic elements and said uranyl nitrate are coprecipitated.

5. A method for recovering uranium and transuranic elements from spent nuclear fuel as defined in claim 3, wherein said oxidation catalyst is at least one element selected from the group consisting of cerium, silver, and cobalt.

6. A method for recovering uranium and transuranic elements from spent nuclear fuel as defined in claim 4, wherein said oxidation catalyst is at least one element selected from the group consisting of cerium, silver, and cobalt.

7. A method for recovering uranium and transuranic elements from spent nuclear fuel as defined in claim 1, wherein said uranium and transuranic elements are uranium, neptunium, plutonium, and americium.

8. A method for recovering uranium and transuranic elements from spent nuclear fuel as defined in claim 2, wherein said uranium and transuranic elements are uranium, neptunium, plutonium, and americium.

9. A method for recovering uranium and transuranic elements from spent nuclear fuel as defined in claim 3, wherein said uranium and transuranic elements are uranium, neptunium, plutonium, and americium.

10. A method for recovering uranium and transuranic elements from spent nuclear fuel as defined in claim 4, wherein said uranium and transuranic elements are uranium, neptunium, plutonium, and americium.

11. A method for recovering, from spent nuclear fuel, uranium and transuranic elements which can be used as nuclear fuel, comprising the steps of:
    adding said spent nuclear fuel to nitric acid to form a solution while simultaneously performing electrolytic oxidation on the solution;
    cooling the solution while the electrolytic oxidation is being performed; and
    coprecipitating nitrates of uranium and transuranic elements and uranyl nitrate from the cooled solution.

12. A method for recovering, from spent nuclear fuel, uranium and transuranic elements which can be used as nuclear fuel as defined in claim 11, further comprising the steps of:
    redissolving the coprecipitated nitrates of uranium and transuranic elements and uranyl nitrate in nitric acid;
    cooling the mixed solution obtained during the step of redissolving, selectively precipitating said uranyl nitrate, and filtering said uranyl nitrate;
    redissolving the filtered uranyl nitrate in nitric acid so as to prepare a uranyl nitrate solution;
    mixing a mother liquor resulting from the step of coprecipitating with said uranyl nitrate solution to obtain a mixed solution;
    subjecting said mixed solution to electrolytic oxidation;
    cooling said mixed solution after electrolytic oxidation, and coprecipitating said nitrates of uranium and transuranic elements and said uranyl nitrate from said mixed solution.

13. A method for recovering uranium and transuranic elements as defined in claim 11, wherein when dissolving said spent nuclear fuel in nitric acid,
    an oxidation catalyst is added;
    electrolytic oxidation is performed; and
    said nitrates of uranium and transuranic elements and said uranyl nitrate are coprecipitated.

14. A method for recovering uranium and transuranic elements as defined in claim 12, wherein when dissolving said spent nuclear fuel in nitric acid and mixing the mother liquor resulting from the step of coprecipitating with said uranyl nitrate solution,
    an oxidation catalyst is added, electrolytic oxidation is performed, and
    said nitrates of uranium and transuranic elements and said uranyl nitrate are coprecipitated.

15. A method for recovering uranium and transuranic elements from spent nuclear fuel as defined in claim 13, wherein said oxidation catalyst is at least one element selected from the group consisting of cerium, silver, and cobalt.

16. A method for recovering uranium and transuranic elements from spent nuclear fuel as defined in claim 14, wherein said oxidation catalyst is at least one element selected from the group consisting of cerium, silver, and cobalt.

17. A method for recovering uranium and transuranic elements from spent nuclear fuel as defined in claim 11, wherein said uranium and transuranic elements are uranium, neptunium, plutonium, and americium.

18. A method for recovering, from spent nuclear fuel, uranium and transuranic elements which can be used as nuclear fuel as defined in claim 1, further comprising the steps of:
   redissolving the coprecipitated nitrates of uranium and transuranic elements and the uranyl nitrate in nitric acid;
   cooling a first mixed solution obtained by the step of redissolving, selectively precipitating said uranyl nitrate, and filtering said uranyl nitrate;
   redissolving the filtered uranyl nitrate in nitric acid so as to prepare a uranyl nitrate solution;
   subjecting a first mother liquor resulting from the step of coprecipitating to electrolytic oxidation; and
   mixing said uranyl nitrate solution with a second mother liquor obtained after electrolytic oxidation to obtain a second mixed solution, cooling the second mixed solution obtained, and coprecipitating said nitrates of uranium and transuranic elements and said uranyl nitrate from said second mixed solution.

19. A method for recovering, from spent nuclear fuel, uranium and transuranic elements which can be used as nuclear fuel as defined in claim 11, further comprising the steps of:
   redissolving the coprecipitated nitrates of uranium and transuranic elements and the uranyl nitrate in nitric acid;
   cooling a first mixed solution obtained by the step of redissolving, selectively precipitating said uranyl nitrate, and filtering said uranyl nitrate;
   redissolving the filtered uranyl nitrate in nitric acid so as to prepare a uranyl nitrate solution;
   subjecting a first mother liquor resulting from the step of coprecipitating to electrolytic oxidation;
   mixing said uranyl nitrate solution with a second mother liquor obtained after electrolytic oxidation to obtain a second mixed solution, cooling the second mixed solution, and coprecipitating said nitrates of uranium and transuranic elements with uranyl nitrate from said second mixed solution.

* * * * *